United States Patent Office 3,063,251
Patented Nov. 13, 1962

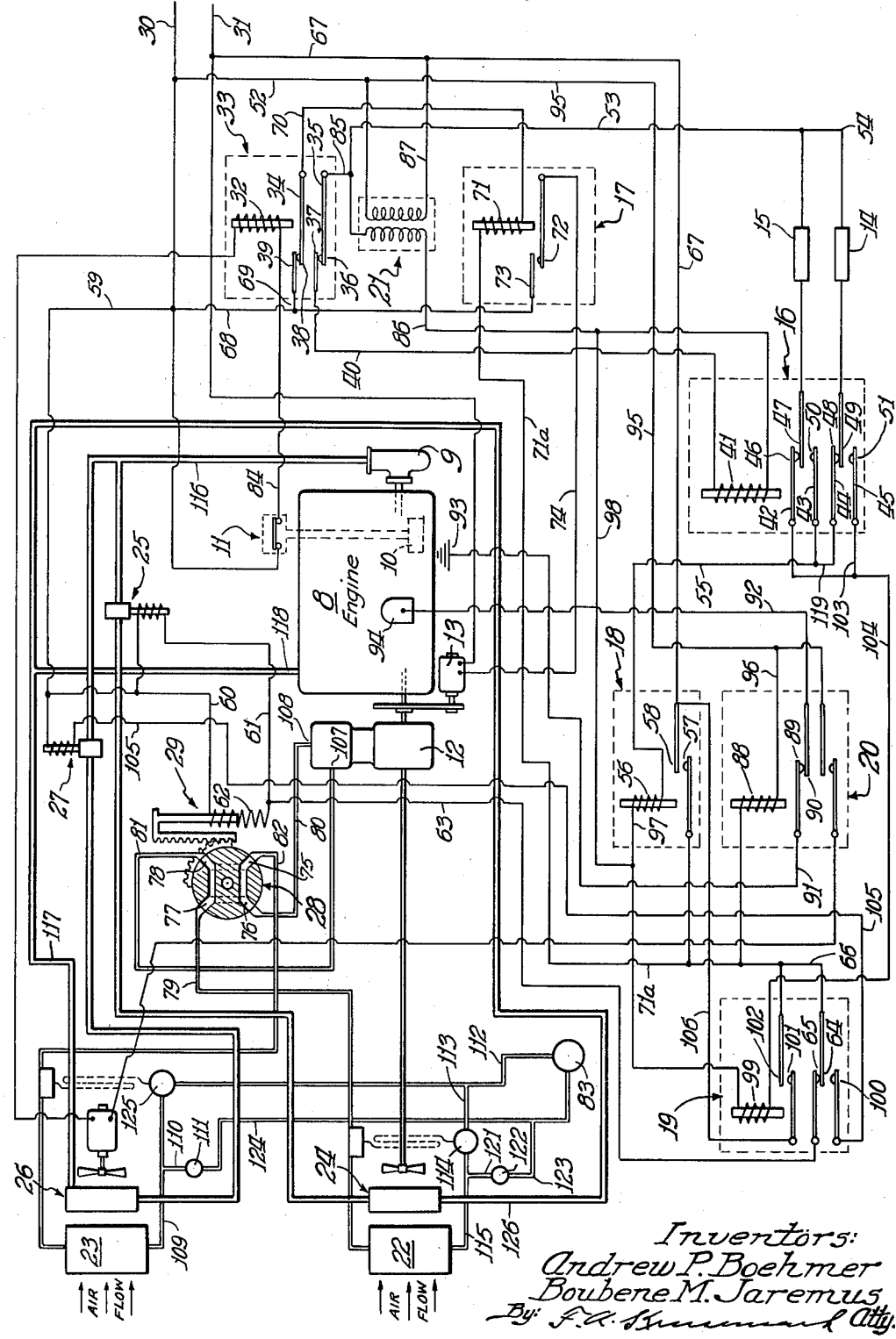

3,063,251
STARTING RELAY SYSTEM FOR HEAT PUMPS
Andrew Peter Boehmer, Des Plaines, and Boubene M. Jaremus, Barrington, Ill., assignors to Borg-Warner Corporation, Chicago, Ill., a corporation of Illinois
Filed Oct. 23, 1959, Ser. No. 848,375
5 Claims. (Cl. 62—160)

This invention relates to heat pumps wherein the power for operating the same is an internal combustion engine and is particularly concerned with means for reducing the discharge pressure when the internal combustion engine is being cranked.

Heat pump systems operate in a heating cycle and a cooling cycle and generally comprise an indoor heat transfer unit and an outdoor heat transfer unit connected by a piping system with control valves and a compressor which forces a suitable refrigerant through the system. When the system operates in a cooling cycle, the refrigerant, in gaseous form, is directed by the compressor first to the outdoor transfer unit which is then operating as a condenser in which the refrigerant is liquified and then through expansion valve means to the indoor transfer unit which is now operating as a heat evaporator whereby the heat is absorbed and the refrigerant is again vaporized and flows back to the compressor. Conversely, when the system operates in a heating cycle, the flow direction of the refrigerant is reversed with the result the compressor discharge is first directed to the indoor transfer unit which now becomes a condenser.

The direction of flow of the refrigerant from the discharge side of the compressor to the suction side is controlled in heat pump systems by a four-way or change-over valve usually controlled by means which selects the desired cycle; namely, either heating or cooling.

Pressure differentials developed between the compressor discharge and suction sides during each operating cycle are quite substantial and therefore present a problem with respect to the engine cranking starter when the internal combustion engine is being cranked.

It is therefore a primary object of this invention to provide means whereby the cooler of the two heat transfer units is utilized to act as the condenser during starting whereby the discharge pressure is reduced during the cranking of the internal combustion engine.

It is a further object of this invention to provide a means for balancing the pressure on the suction and discharge sides of the compressor so that when the engine is started the cranking load is reduced for easy starting.

It is another object of this invention to provide means whereby the system is set up to operate in the heating cycle, when the system shuts off after having been operating in the cooling cycle and switches over to the normal cycle; namely, cooling, when the internal combustion engine starts operating.

It is still another object of this invention to provide means whereby the system, when conditions are such as to call for operation in the heating cycle, the system switches over to cooling, initially, simultaneous with the inception of cranking of the internal combustion engine, and switches back to the heating cycle when the internal combustion engine starts operating.

It is also an important object of this invention to provide a normally closed pressure sensitive switch in the electrical system, which is opened by oil pressure when the internal combustion engine is operating, and thereby de-energizes a relay coil in the electric circuitry which sets up a circuit through relay means which includes the coil of a cooling relay when the system is operating in the cooling cycle, and sets up a circuit through relay means which includes the coil of a heating relay when the system is operating in the heating cycle.

The invention consists of the novel constructions, arrangements and devices to be hereinafter described and claimed for carrying out the above stated objects and such other objects as will be apparent from the following description of a preferred embodiment of the invention illustrated with reference to the accompanying drawing.

The sole drawing represents a diagrammatic layout of the system.

The system comprises an internal combustion engine 8 having an engine driven circulating water pump 9, an oil pressure lubricating system 10 operably connected with a pressure sensitive switch 11, normally closed, a compressor 12 driven by the internal combustion engine 8, a suitable electric motor 13 for starting the internal combustion engine 8 and a pair of conventional heating and cooling thermostats, 14 and 15, respectively, for controlling cycling of the heat pump system. A compressor unloading relay 16, a starting motor relay 17, a cooling relay 18, a heating relay 19, a magneto relay 20, a transformer 21, an outdoor heat exchanger 22, an indoor heat exchanger 23, a summer air conditioning radiator 24 controlled by a solenoid valve 25, a winter heating radiator 26 controlled by a solenoid valve 27, and a four-way valve 28 operable by a solenoid 29 are also provided in the system and function as hereinafter described.

When the system is connected to a source of electrical power by means of a pair of electric conductors 30 and 31 and the system is in its off phase, following its operation in the heating cycle, the pressure sensitive switch 11 is closed, allowing the current to flow through the conductor 30 to thereby energize a coil 32 of an oil pressure control relay 33 which thereby actuates a pair of arms 34 and 35 to interconnect a pair of contacts 36 and 37 and a pair of contacts 38 and 39, respectively. The closing of the contacts 38 and 39 partially prepares the starting motor relay 17 for its next operating cycle. The closing of the contacts 36 and 37 allows current to flow through a lead 40 thereby energizing a coil 41 of the compressor unloading relay 16 thus actuating arms 42, 43, 44 and 45, whereby a pair of contacts 46 and 47 and a pair of contacts 48 and 49, respectively, are interconnected; and the contact 47 and a contact 50, and the contact 49 and a contact 51, respectively, are broken.

When the temperature drops to a pre-determined value the heating thermostat 14 closes thereby establishing an electric circuit allowing current to flow through the electric conductor 30, a lead 52, through the transformer 21 whereby a suitable low voltage current is produced which flows through leads 53 and 54, the heating thermostat 14, the closed contacts 48 and 49, the arm 44, a lead 55 to a coil 56 of the cooling relay 18 thereby energizing the coil 56 which causes interconnection between a pair of contacts 57 and 58. Thus a circuit has been established with respect to the solenoid 29 which operates the four-way valve 28. This circuit consists of a lead 59, a lead 60 and a lead 61 connected to opposite sides of a coil 62 of the solenoid 29, a lead 63, a pair of interconnected contacts 64 and 65, a lead 66, interconnected contacts 57, and 58, and a lead 67.

Simultaneous with the completion of the circuit with respect to the solenoid 29, a circuit is completed with respect to the starting motor relay 17. This circuit consists of a lead 68 connected to the electric conductor 30, a lead 69, the interconnected contacts 38 and 39, the arm 34, a lead 70 connected to one end of a coil 71 of the relay 17, a lead 71a connected to the other end of the coil 71, the lead 66, the interconnected contacts 57 and 58 and the lead 67. The completion of this circuit energizes the coil 71 of the starting motor relay 17 thereby interconnecting a pair of contacts 72 and 73 which completes the electric circuit for starting the electric motor 13. This circuit consists of the lead 68, interconnected contacts 72 and 73, a lead 74 connected to the one side of the electric motor 13 and the electric conductor 31 which serves as the return.

Thus it is apparent that when these two circuits referred to above are completed, the electric motor 13, through a conventional means, will start cranking the internal combustion engine 8, and the four-way valve 28 will be moved by the solenoid 29 so that a pair of ports 75 and 76 and a second pair of ports 77 and 78 will be connected to pipes 80 and 79, respectively, and pipes 81 and 82, respectively, thereby switching the system to cooling which unloads a receiver 83 thereby balancing the pressure in the system for easier cranking of the internal combustion engine 8 which drives the compressor 12 for supplying the refrigerant through a piping system hereinafter more fully explained. The switch to cooling, when the heating thermostat 14 calls for operation in the heating cycle, is done initially for easier cranking of the internal combustion engine 8 as heretofore stated, and when the engine 8 starts, the system will switch back to heating as hereinafter shown. It should also be noted at this time that the switching over to the cooling cycle, when operation in the heating cycle is called for, allows the outdoor heat exchanger 22 to act as a condenser and the indoor heat exchanger 23 to act as an evaporator during cranking. This allows cranking of the internal combustion engine 8 at a lower torque because the compressor is operating against a much lower discharge pressure because, during winter heating, the outdoor temperature is generally much lower than the indoor temperature; consequently, when the outdoor heat exchanger 22 is acting as a condenser, condensation occurs at a much lower pressure. It is this outdoor temperature; for example, 25 degrees F. which would cause a much lower discharge pressure during cranking than would be the case if the indoor heat exchanger 23 were used as a condenser with; for example, a temperature of 75 degrees F.

After the internal combustion engine 8 starts through the cranking operation of the electric motor 13, the oil pressure in the lubricating system 10 is built up to a sufficient value to cause the pressure sensitive switch 11 to open thus breaking the connection between the electrical conductor 30 and a lead 84 which is connected to the coil 32 of the oil pressure control relay 33 thereby de-energizing the coil 32 which causes separation between the interconnected contacts 36 and 37 and the interconnected contacts 38 and 39, respectively. The separation of the contacts 38 and 39 breaks the circuit with respect to the starting motor relay 17 whereby de-energizing its coil 71 which causes separation between contacts 72 and 73 thereby breaking the electric circuit with respect to the electric starting motor relay 17 which causes the electric motor 13 to stop. This circuit consists of the electric conductor 30 and the leads 68 and 74, interconnected by contacts 72 and 73 and the return, the electric conductor 31.

The separation of the interconnected contacts 36 and 37 breaks an electric circuit with respect to the compressor unloading relay 16 which circuit consists of the electric conductor 30, the lead 52, through the hot side of the transformer 21, to a lead 85, the arm 35, interconnected contacts 36 and 37, the lead 40, the coil 41, a return lead 86, through the return side of the transformer 21 to a lead 87 and the electric conductor 31. The breaking of this circuit de-energizes the coil 41 which causes interconnected contacts 46 and 47 and interconnected contacts 48 and 49 to separate, respectively, and causes an interconnection between contacts 47 and 50 and an interconnection between contacts 49 and 51, respectively. The closing of the heating thermostat 14 also sets up an electric circuit with respect to the magneto relay 20. This electric circuit energizes a coil 88 of the magneto relay 20 which causes separation of a pair of interconnecting contacts 89 and 90 having leads 91 and 92, respectively, to a ground 93 and a magneto 94, respectively, whereby the magneto 94 is placed in condition for supplying high tension voltage for the internal combustion engine 8. The electric current for this circuit is provided by the electric conductor 30 and a pair of leads 95 and 96. The separation of the interconnected contacts 48 and 49 will break a circuit with respect to the cooling relay 18 thereby de-energizing the coil 56 thus causing the separation of interconnected contacts 57 and 58. This circuit consists of the electric conductor 30, the lead 52, the hot side of the transformer 21, the leads 53 and 54, the heating thermostat 14, interconnected contacts 48 and 49, the arm 44, the lead 55, the coil 56, a lead 97, a lead 98, the lead 86, the return side of the transformer 21, the lead 87, and the electric conductor 31. The separation of interconnected contacts 57 and 58 breaks the circuit with respect to the solenoid 29 which thereby de-energizes the coil 62. This circuit consists of the electric conductor 30, the leads 59 and 60, the coil 62, the leads 61 and 63, the interconnected contacts 64 and 65, the lead 66, interconnected contacts 57 and 58, the lead 67 and the electric conductor 31. The de-energization of the coil 62 causes the four-way valve 28 to move from its cooling position, as heretofore shown, back into a position of heating as a result of the interconnection between port 75 and pipe 80, between port 76 and pipe 79, between port 78 and pipe 82, and between port 77 and pipe 81 as can be readily observed from the drawing.

The interconnection between contacts 49 and 51, as a result of the de-energization of coil 41 of the compressor unloading relay 16 as heretofore mentioned, establishes a circuit with respect to the heating relay 19 thereby energizing a coil 99 of the heating relay 19 which causes interconnection between the contact 64 and a contact 100 and interconnection between a pair of contacts 101 and 102. This circuit consists of the conductor 30, the lead 52, the hot side of the transformer 21, the leads 53 and 54, the heating thermostat 14, the interconnected contacts 49 and 51, the arm 45, a lead 103, a lead 104, the coil 99, the leads 98 and 86, the return side of transformer 21, the return lead 87, and the electric conductor 31. The interconnection of contacts 64 and 100 and contacts 101 and 102, respectively, set up a circuit with respect to the solenoid valve 27 causing it to open thereby permitting water to be pumped to the winter heating radiator 26 by the water pump 9 as hereinafter more fully explained. This circuit consists of the electric conductor 30, the lead 59, solenoid valve 27, a lead 105, interconnected contacts 100 and 64, the lead 66, the interconnected contacts 101 and 102, a lead 106, the lead 67 and the electric conductor 31.

When the system is thus operating in the heating cycle, the refrigerant, a low pressure vapor, passes into a suction side 107 of the compressor 12 wherein it is compressed and passes through a discharge side 108 of the compressor 12 and thence by means of pipe 80 through ports 76 and 75 of the four-way valve 28 into pipe 82 to the indoor heat exchanger 23 where it changes its state from a vapor to a liquid and then passes through a pipe 109, through a pipe 110 provided with a check valve 111, to a receiver 83 and thence through pipes 112 and 113 through an expansion valve 114 and thence through a pipe 115 into the outdoor heat exchanger 22 where it evaporates to a low pressure vapor and passes through the pipe 79 and thence through ports 77 and 78 of the four-way valve 28, through the pipe 81 into the suction side 107 of the compressor 48 and continues circulating in such a manner until the heating thermostat 14 is satisfied which causes the electrical contacts in the heating thermostat 14 to separate thus interrupting the electric circuit with respect to the magneto relay 20 thereby de-energizing the coil 88 which causes interconnection between contacts 89 and 90 thus grounding the magneto 94 which shuts off the supply of electric current for the operation of the internal combustion engine 8 as can be seen from the drawing and understood from the heretofore delineation of the various electric circuits.

It should be noted at this time that during the operation in the heating cycle the winter heating radiator 26 is used as the coolant radiator for the internal combustion engine 8 due to the opening of the solenoid valve 27 as heretofore shown which causes water to be circuated through the winter heating radiator 26 by the operation of the circulating water pump 9 which forces water through a pipe 116 into the winter heating radiator 26 and hence back through a pipe 117 and a pipe 118 back to the internal combustion engine 8. The air passing through the winter heating radiator 26 is used as a supplemental provision of heat during the operation in the heating cycle.

When the system has been operating in the cooling cycle and is in the off phase, the various electric circuits are in the status as shown in the drawing and when operation in the cooling cycle is again called for by the closing of the electrical contacts in the cooling thermostat 15, a circuit is established with respect to the heating relay 19 which energizes the coil 99 of the heating relay 19 thereby causing interconnection between the contacts 101 and 102 and the contacts 64 and 100 respectively. This circuit consists of the electric conductor 30, the lead 52, the hot side of the transformer 21, the lead 53, the cooling thermostat 15, interconnected contacts 46 and 47, the lead 104, the coil 99, the leads 98 and 86, the return side of the transformer 21, the lead 87 and the electric conductor 31.

Interconnection of contacts 101 and 102 and the interconnection of contacts 64 and 100, respectively, set up circuits with respect to the starting motor relay 17, the solenoid valve 27 and the magneto relay 20. The completion of the circuit with respect to the solenoid valve 27 causes it to open. This electric circuit consists of the electric conductor 30, lead 59, solenoid valve 27, the lead 105, the interconnected contacts 64 and 100, the lead 66, interconnected contacts 101 and 102, the leads 106 and 67, and the electric conductor 31. The completion of the circuit with respect to the magneto relay 20 energizes its coil 88 thereby causing separation between the contacts 89 and 90 which separates the lead 91 from the ground 93, from the lead 92 to the magneto 94, thereby placing the magneto 94 in condition to supply current for the operation of the internal combustion engine 8. This circuit consists of the electric conductor 30, the leads 95 and 96, coil 88, the lead 72, the lead 66, the interconnected contacts 101 and 102, the leads 106 and 67 and the electric conductor 31. The completion of the circuit with respect to the starting motor relay 17 energizes the coil 71 of the starting motor relay 17 thereby causing interconnection between the contacts 72 and 73. This circuit consists of the electric conductor 30, the leads 68 and 69, the interconnected contacts 38 and 39, the arm 34, the lead 70, the coil 71, the leads 72 and 66, the interconnected contacts 101 and 102, the leads 106 and 67 and the electric conductor 31.

The interconnection of the contacts 72 and 73 sets up a circuit with respect to the electric starting motor 13. This circuit consists of the electric conductor 30, the lead 68, the interconnected contacts 72 and 73, the lead 74 and the electric conductor 31. Completion of this circuit provides current for the electric starting motor 13 whereby, through conventional means, the internal combustion engine 8 is cranked for starting.

After the internal combustion engine 8 starts by the cranking operation of the electric motor 13, the oil pressure lubricating system 10 is built up to a sufficient value to cause the pressure sensitive switch 11 to open thus breaking the connection between the electric conductor 30 and the lead 84 which is connected to the coil 32 of the oil pressure control relay 33 thereby de-energizing the coil 32 which causes separation of the interconnected contacts 36 and 37, respectively, and the interconnected contacts 38 and 39, respectively. The separation of the contacts 38 and 39 breaks the circuit with respect to the starting motor relay 17 thereby de-energizing its coil 71 which causes separation of the contacts 72 and 73 and thereby breaks the circuit with respect to the electric starting motor relay 17 which causes the electric starting motor 13 to stop.

The separation of the interconnected contacts 36 and 37 breaks the electric circuit with respect to the compressor unloading relay 16 which causes separation of interconnection between contacts 47 and 50 and interconnected contacts 48 and 49, respectively, and causes inter connection between contacts 47 and 50 and interconnection between contacts 49 and 51, respectively, as heretofore described.

The interconnection of contacts 47 and 50 establishes a circuit with respect to the cooling relay 18, and the separation of the interconnected contacts 46 and 47 breaks the circuit with respect to the heating relay 19 whereby the coil 99 is de-energized which causes the separation of the interconnected contacts 101 and 102 and the separation of interconnected contacts 64 and 100, and causes interconnection between contacts 64 and 65. This circuit consists of the electric conductor 30, the lead 52, the hot side of the transformer 21, the lead 53, the cooling thermostat 15, interconnected contacts 47 and 50, the arm 44, a lead 119, the lead 55, the coil 56, leads 97, 98 and 86, the return side of the transformer 21 and the electric conductor 31. The completion of the circuit energizes the coil 56 of the cooling relay 18 whereby the contacts 57 and 58 are interconnected which in conjunction with the interconnection of contacts 64 and 65 caused by the breaking of the circuit with respect to the heating relay 19, sets up a circuit with respect to the solenoid valve 25 and the four-way valve 28, as heretofore mentioned, whereby the solenoid valve 25 is opened which connects the piping system between the summer air conditioning radiator and the water circulating pump 9 and the four-way valve is moved into a position for operation in the cooling cycle by causing interconnection between the port 77 and pipe 81, the port 78 and pipe 82, port 75 and pipe 80, port 76 and pipe 79, respectively. The circuit with respect to the solenoid valve 25 consists of the electric conductor 30, the lead 59, a lead 120, the solenoid valve 25, the leads 61 and 63, the interconnected contacts 64 and 65, the interconnected contacts 57 and 58, the lead 67 and the electric conductor 31. The circuit with respect to the four-way valve 28 consists of the electric conductor 30, leads 59 and 60, the coil 62, the leads 61 and 63, the interconnected contacts 64 and 65, the lead 66, the interconnected contacts 57 and 58, the lead 67 and the electric conductor 31.

The system when thus operating in the cooling cycle is similar to that of the heating cycle except that the flow of the refrigerant through the heat exchangers 22 and 23 is reversed such that the outdoor heat exchanger 22 is acting as the condenser and the indoor heat exchanger 23 is acting as the evaporator. When thus operating in the cooling cycle, the refrigerant is a low pressure vapor when it enters the suction side 107 of the compressor 12. This vapor is compressed to a high pressure vapor by the compressor 12 and then passes through the pipe 80, the port 75, the port 76, and into the pipe 79 to the outdoor heat exchanger 22 where the high pressure vapor is converted to a liquid. This liquid then passes through the pipe 115, a pipe 121, a check valve 122, a pipe 123, a pipe 124, and into the receiver 83 (check valve 111 being closed) and thence through pipe 112 to an expansion valve 125 where the high pressure liquid is reduced in pressure to a low pressure mixture and passes through the pipe 109 into the indoor heat exchanger 23 wherein the low pressure mixture is converted to a low pressure vapor. The low pressure vapor passes through the pipe 82, port 78, port 77, pipe 81 into the suction side 107 of the compressor 12, thus completing the cycle of the refrigerant during the operation of the system in the cooling cycle. The system continues to operate in the cooling cycle until the cooling thermostat 15 is satisfied, which causes the internal combustion engine 8 to shut down as heretofore shown as a result of opening of the pressure sensitive switch 11 which sets in motion the sequences as heretofore shown, thus causing the deenergization of the coil 62 of the solenoid 29 thereby switching the four-way valve to the heating cycle position which balances the pressure in the system for easier starting when the cooling thermostat 15 again calls for operation in the cooling cycle.

It should be noted that during the operation in the cooling cycle, the solenoid valve 25 is open, as heretofore stated, whereby the summer air conditioning radiator 24 is acting as the cooling radiator for the internal combustion engine 8, the water thus circulating from the water circulating pump 9 through the pipe 116, a pipe 125, into the summer air conditioning radiator 24 and thence through a pipe 126, the pipe 118 and back to the internal combustion engine 8.

To summarize generally, this system is provided with an internal combustion engine 8 which serves as the power means for operating the heat pump system in a heating and a cooling cycle. When the system has been operating in the heating cycle and the system is shut down because the heating thermostat 14 is satisfied, the four-way valve 28 remains positioned for operation in the heating cycle; however, when the heating thermostat 14 again calls for the operation of the system in the heating cycle, the four-way valve 28 switches over temporarily to a position for operating in the cooling cycle thereby balancing the pressure in the system for easier starting while the internal combustion engine 8 is being cranked and also, the temporary switching over to the cooling cycle allows the outdoor heat exchanger 22 to act as a condenser and the indoor heat exchanger 23 to act as an evaporator during this cranking period thereby providing further reduction of resistance with respect to cranking of the internal combustion engine 8 as heretofore shown. After the internal combustion engine 8 starts and the oil pressure in the lubricating system 10 is built up to a sufficient value, the pressure sensitive switch 11 opens, and the sequence of events heretofore shown follow, thereby causing the four-way valve 28 to switch back to a position for heating in which cycle it has been called to operate by the heating thermostat 14. It is therefore apparent that this temporary switch-over of the four-way valve to the cooling cycle while the system is being started to operate in the heating cycle, reduces the burden on the electric starting motor 13 for the reasons just given thereby permitting the use of a smaller electric motor 13 than otherwise would be the case for starting purposes.

When the system is operating in the cooling cycle and the cooling thermostat 15 becomes satisfied, the internal combustion engine 8 stops and the four-way valve 28 switches over to a position for operation in the heating cycle thereby balancing the pressure in the system as heretofore shown, and thereby provides for easier cranking of the internal combustion engine 8 when the cooling thermostat 15 closes and again calls for operation in the cooling cycle. When the internal combustion engine 8 starts, the four-way valve 28 moves back to a position for operating in the cooling cycle as a result of the heretofore delineated sequence of events.

It is to be understood that this invention is not to be limited to the specific constructions and arrangements shown and described except only insofar as the appended claims may be so limited, as it will be apparent to those skilled in that art that changes may be made without departing from the principles of the invention.

We claim:

1. A heat pump system connectable to a source of electric power, operable in a heating cycle and a cooling cyle, a heating thermostat and a cooling thermostat for initiating the operation in said heating and said cooling cycles, respectively, a compressor, an internal combustion engine for operating said system and operably connected to said compressor said engine being provided with a lubricating system, an electric motor having conventional cranking means for starting said engine, a pair of heat exchangers, a changeover valve, piping interconnecting said changeover valve with said compressor and said heat exchangers, a solenoid for shifting said changeover valve for alternating the function of said heat exchangers as a condenser and evaporator with respect to said heating and cooling cycles said solenoid being de-energized at the completion of each said cycle whereby the said system is positioned for operation in the said heating cycle at the start of subsequent cycles; control means for equalizing pressure in said system when said heating thermostat initiates operation in said heating cycle, said control means comprising; electric circuitry including a switch and connected with respect to said solenoid, said electric motor and said heating thermostat; means connected with respect to said engine for opening said switch when said engine is running; first relay means in said circuitry for completing a first circuit with respect to said solenoid when said heating thermostat initiates operation of said heat pump system in said heating cycle thereby energizing said solenoid and causing said changeover valve to move into position for operation of said system in said cooling cycle; second relay means in said circuitry for completing a second circuit with respect to said electric motor thereby causing said electric motor to crank said engine whereby said heat pump system is operating in said cooling cycle when said engine is being cranked and whereby when said engine starts running said means causes said switch to open thereby simultaneously breaking the said first and second circuits, which respectively, de-energizes the said solenoid causing the said changeover valve to return to a position for operation of said system in the said heating cycle and causes the said electric motor to stop.

2. A heat pump system according to claim 1 wherein the said means that is connected with respect to said engine for opening said switch when said engine is running comprises a pressure responsive element operably connected with respect to said lubricating system and said switch.

3. A heat pump system connected to a source of electric power, operable in a heating cycle and a cooling cycle, a heating thermostat and a cooling thermostat for initiating the operation in said heating and said cooling cycles, respectively, a compressor, an internal combustion engine for operating said system and operably connected to said compressor, said engine being provided with a lubricating system, an electric motor having conventional cranking means for starting said engine, a pair of heat exchangers, a changeover valve, piping interconnecting said changeover valve with said compressor and said heat exchangers, a solenoid for shifting said changeover valve for alternating the function of said heat exchangers as a condenser and evaporator with respect to the said heating and cooling devices, said solenoid being de-energized at the completion of each said cycles whereby the said system is positioned for operation in the heating cycle at the start of subsequent cycles; control means for equalizing pressure in said system when said cooling thermostat initiates operation in said cooling cycle, said control means comprising; electric circuitry including a switch and connected with respect to said solenoid, said electric motor and said cooling thermostat; means connected with respect to said engine for opening said switch when said engine is running; first relay means in said circuitry for breaking a first circuit including said switch and said solenoid when said cooling thermostat initiates operation of said heat pump system in said cooling cycle thereby de-energizing said solenoid which causes said changeover valve to move into position for operation of said system in said heating cycle; second relay means in said circuitry for completing a second circuit with respect to said electric motor thereby causing said electric motor to crank the said engine, said means causing said switch to open when said engine is running thereby completing said first circuit and simultaneously therewith breaks the said second circuit whereby, respectively, said solenoid is energized and moves the changeover valve into position for operation of the system in the said cooling cycle, and the said electric motor stops.

4. A heat pump system according to claim 3 wherein the said means that is connected with respect to said engine for opening said switch when said engine is running comprises a pressure responsive element operably connected with respect to said lubricating system and said switch.

5. A heat pump system connectable to a source of electric power, operable in a heating cycle and a cooling cycle, a heating thermostat and a cooling thermostat for initiating the operation in said heating and said cooling cycles, respectively, a compressor, an internal combustion engine for operating said system and operably connected to said compressor said engine being provided with a lubricating system, an electric motor having conventional cranking means for starting said engine, a pair of heat exchangers, a changeover valve, piping interconnecting said changeover valve with said compressor and said heat exchangers, a solenoid for shifting said changeover valve for alternating the function of said heat exchangers as a condenser and evaporator with respect to the said heating and cooling cycles said solenoid being de-energized at the completion of each said cycle whereby the said system is positioned for operation in the said heating cycle at the start of subsequent cycles; control means for equalizing pressure in said system when the said heating thermostat initiates operation in said heating cycle and the said cooling thermostat initiates operation in said cooling cycle, said control means comprising; electric circuitry including a switch, and connected with respect to said solenoid, said electric motor and said heating thermostat; means connected with respect to said engine for opening said switch when said engine is running; first relay means in said circuitry for completing a first circuit with respect to said solenoid when said heating thermostat initiates operation of said heat pump system in said heating cycle thereby energizing said solenoid and causing said changeover valve to move into position for operation of said system in said cooling cycle; second relay means in said circuitry for completing a second circuit with respect to said electric motor thereby causing said electric motor to crank said engine whereby said heat pump system is operating in said cooling cycle when said engine is being cranked and whereby when said engine starts running said means causes said switch to open thereby simultaneously breaking the said first and second circuits, which, respectively, de-energizes the said solenoid causing the said changeover valve to return to a position for operation of said system in the said heating cycle and causes the said electric motor to stop; third relay means for breaking said first circuit when said cooling thermostat initiates operation of said heat pump system in said cooling cycle thereby de-energizing said solenoid which causes said changeover valve to move into position for operation of said system in said heating cycle; fourth relay means in said circuitry for completing said second circuit with respect to said electric motor thereby causing said electric motor to crank the said engine, said means causing said switch to open when said engine is running thereby completing said first circuit and simultaneously therewith breaks the said second circuit whereby, respectively, said solenoid is energized and moves the said changeover valve into position for operation of the system in the said cooling cycle, and the said electric motor stops.

References Cited in the file of this patent
UNITED STATES PATENTS

| | | |
|---|---|---|
| 1,786,791 | Terry | Dec. 30, 1930 |
| 1,894,285 | Swezey | Jan. 17, 1933 |
| 2,181,053 | Hamilton | Nov. 21, 1939 |
| 2,780,077 | Jacobs | Feb. 5, 1957 |
| 2,887,853 | Talmey | May 26, 1959 |
| 2,900,805 | Tilney | Aug. 25, 1959 |

UNITED STATES PATENT OFFICE
CERTIFICATE OF CORRECTION

Patent No. 3,063,251　　　　　　　　　　　　November 13, 1962

Andrew Peter Boehmer et al.

It is hereby certified that error appears in the above numbered patent requiring correction and that the said Letters Patent should read as corrected below.

Column 6, line 8, for "interconnection between contacts 47 and 50 and" read -- interconnected contacts 46 and 47 and separation of --.

Signed and sealed this 30th day of April 1963.

(SEAL)
Attest:

ERNEST W. SWIDER　　　　　　　　　　　　DAVID L. LADD
Attesting Officer　　　　　　　　　　　　Commissioner of Patents